US009692876B2

(12) United States Patent
Grimme et al.

(10) Patent No.: US 9,692,876 B2
(45) Date of Patent: Jun. 27, 2017

(54) SUPPRESS AND RESUME NOTIFICATIONS BASED ON MOTION

(71) Applicant: Lenovo (Singapore) Pte. Ltd., Singapore (SG)

(72) Inventors: Jason M. Grimme, Cary, NC (US); Russell S. VanBlon, Raleigh, NC (US); Russell S. Gantman, Fuquay Varina, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1 day.

(21) Appl. No.: 14/672,779

(22) Filed: Mar. 30, 2015

(65) Prior Publication Data

US 2016/0292994 A1  Oct. 6, 2016

(51) Int. Cl.
*G08B 23/00* (2006.01)
*H04M 1/725* (2006.01)
*G08B 7/06* (2006.01)
*H04M 1/67* (2006.01)

(52) U.S. Cl.
CPC ........... *H04M 1/72569* (2013.01); *G08B 7/06* (2013.01); *H04M 1/67* (2013.01)

(58) Field of Classification Search
CPC ......... H04L 12/2827; H04N 21/44213; H04M 1/72597; H04M 2250/12; H04M 1/72569; H04W 68/02; G08B 19/00

USPC ......................................................... 340/527
See application file for complete search history.

(56) References Cited

U.S. PATENT DOCUMENTS

| 8,306,508 | B1* | 11/2012 | Lundy ............... | H04M 1/72597 455/412.1 |
| 2005/0286686 | A1* | 12/2005 | Krstulich ........... | G06Q 30/0205 379/32.01 |
| 2014/0280575 | A1* | 9/2014 | Cowan ................... | H04L 67/22 709/204 |
| 2015/0180976 | A1* | 6/2015 | Xiao ....................... | H04L 67/12 709/203 |

* cited by examiner

*Primary Examiner* — Don N Vo
(74) *Attorney, Agent, or Firm* — VanLeeuwen & VanLeeuwen; Carlos Munox-Bustamante

(57) ABSTRACT

An approach is provided to receive notifications at a device. The approach senses whether an activity, such as movement of the device, has occurred within a time period prior to the current time with the activity being a result of a user action, such as movement or usage, on the device. In response to sensing that an activity has occurred within the time period, an alert is generated at the device to alert the user of the notification. On the other hand, in response to sensing that activity did not occur during the time period, the alert is not generated at the device.

15 Claims, 7 Drawing Sheets

SUPPRESS AND RESUME NOTIFICATIONS BASED ON MOTION

BACKGROUND

Portable devices can receive notifications from external services at any time of the day. At certain parts in the day such as when sleeping at night, the user might not want to be notified of updates. Most devices have a time window during which the user can request not to be notified. However, in current technologies, this is a time-based window that is manually set by the user or automatically set to a default quiet time, such as from 10:00 PM to 8:00 AM, etc., and might not accurately reflect when the user is active and inactive. For example, if the user woke up two hours earlier than normal and began their day, they will not receive notifications until the normal pre-programmed time setting.

SUMMARY

An approach is provided to receive notifications at a device. The approach senses whether an activity, such as movement of the device, has occurred within a time period prior to the current time with the activity being a result of a user action, such as movement or usage, on the device. In response to sensing that an activity has occurred within the time period, an alert is generated at the device to alert the user of the notification. On the other hand, in response to sensing that activity did not occur during the time period, the alert is not generated at the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
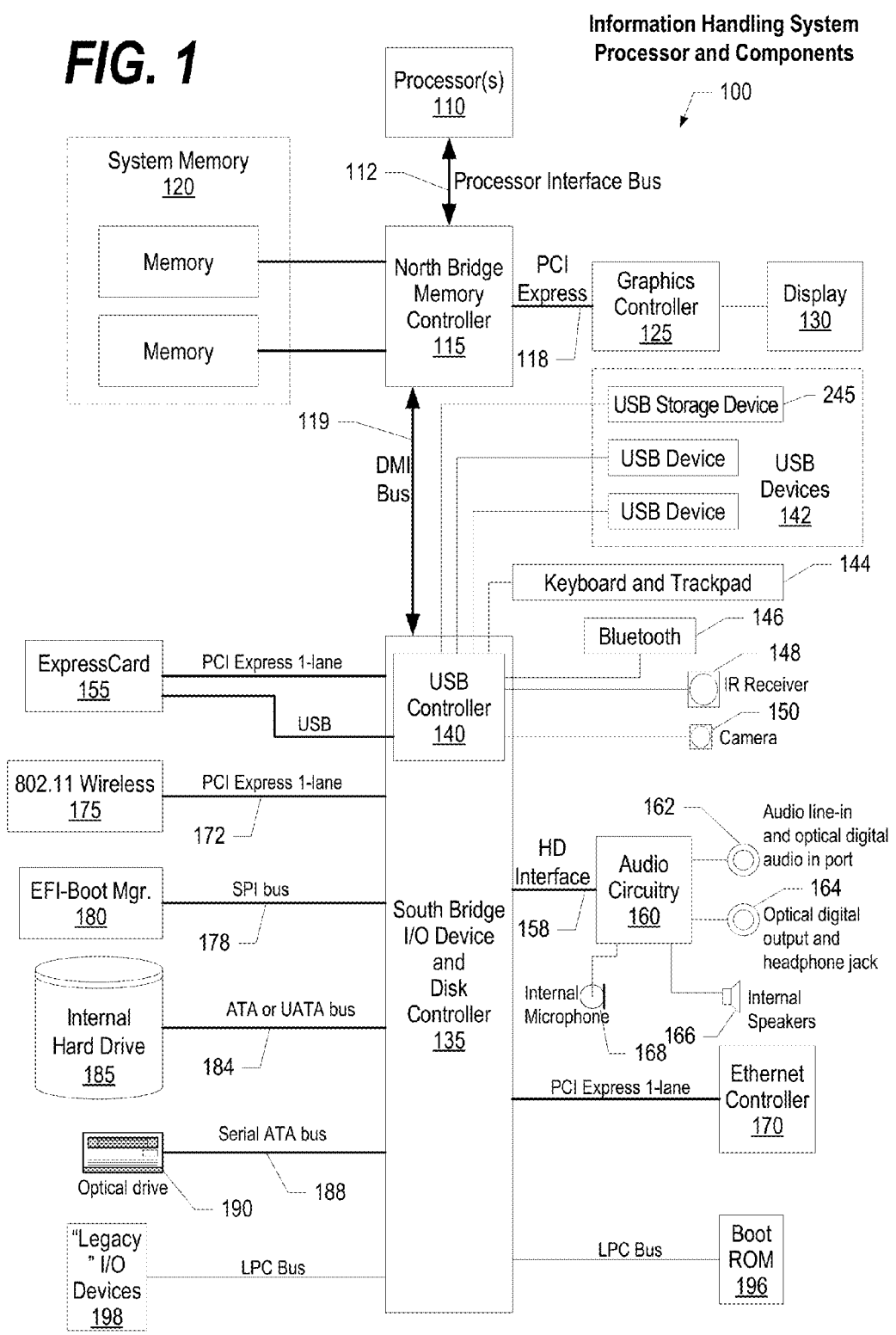
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
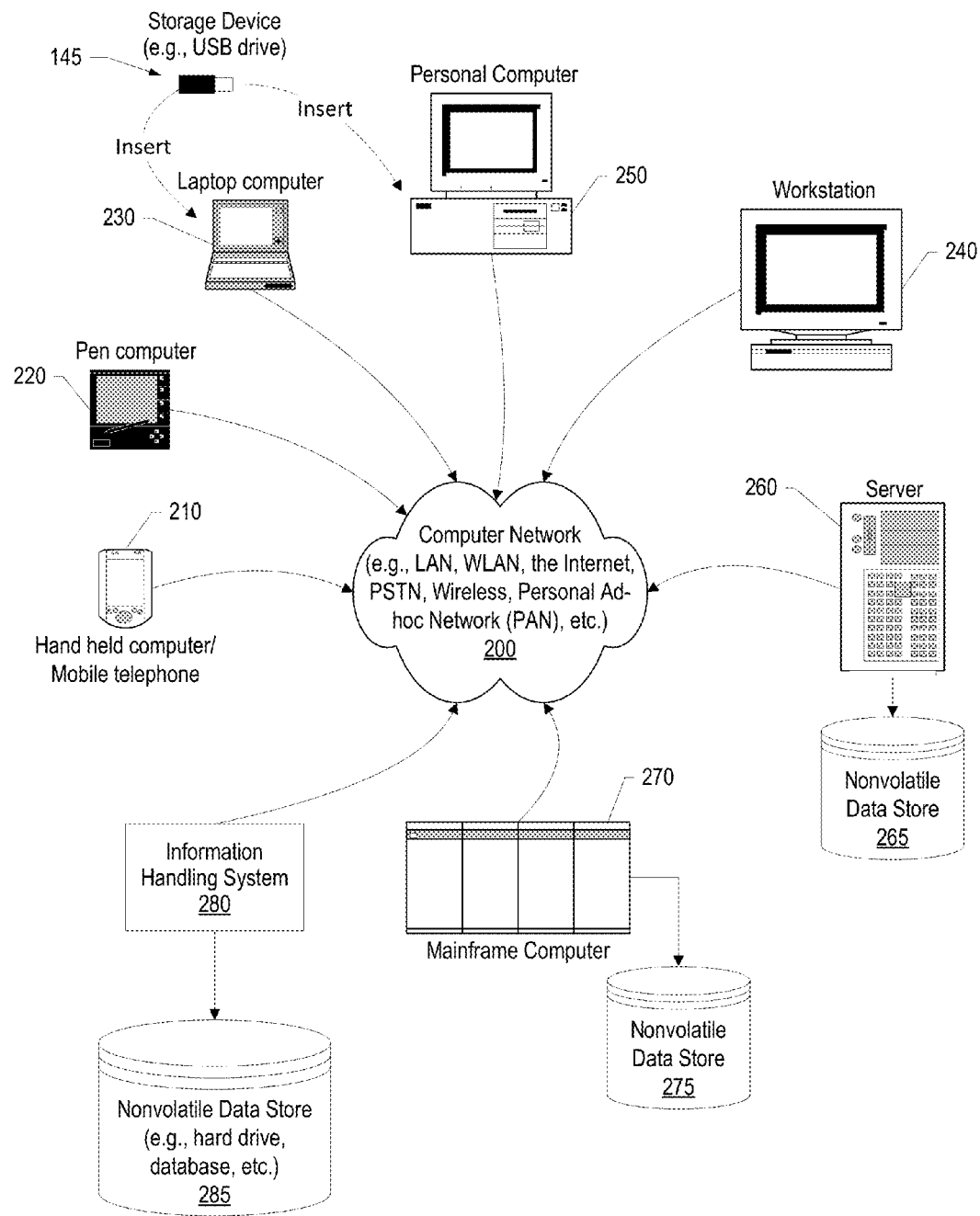
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
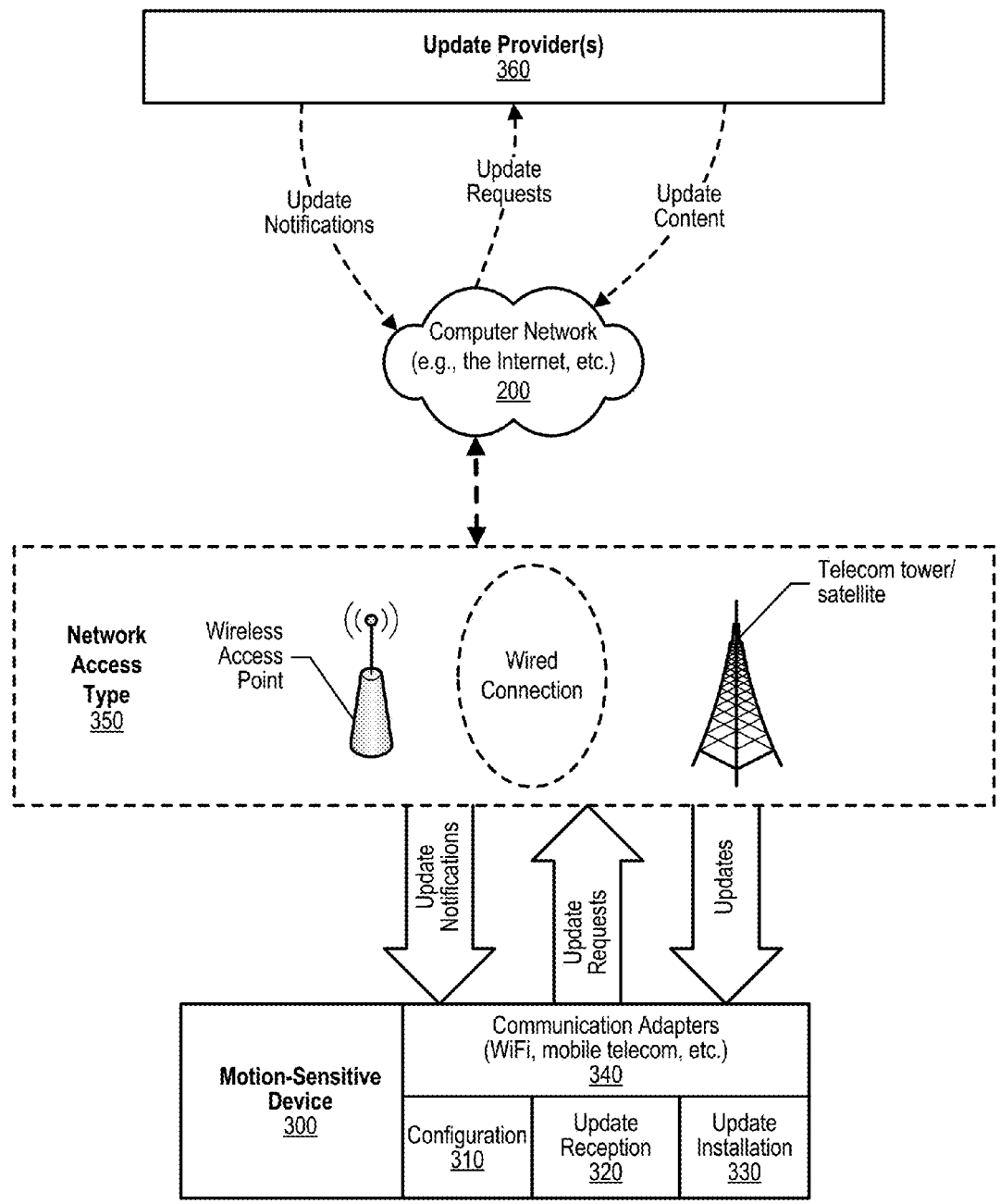
FIG. 3 is a component diagram depicting interactions between the various components that suppress and resume notifications at a device based on motion.

FIG. 3 is a component diagram depicting interactions between the various components that suppress and resume notifications at a device based on motion. Motion sensitive device 300, such as a smart phone, tablet or slate computer, notebook computer, handheld electronic device, or the like, includes configuration process 310 that configures the user's preferences regarding the reception of update notifications from providers 360. Motion sensitive device 300 further includes update reception process 320 that receives update notifications and their associated updates from the update providers. In addition, update reception process 320 includes a process that alerts the user of the device of the update, such as with an audible sound emitted from the device, a message displayed on a display screen of the device, a vibration of the device or portion of the device, or any combination of alerts. Update installation process 330 is the process that actually installs the update which may be dependent on the update, the device, and/or the operating system running on the device.

Motion sensitive device 300 further includes one or more communication adapters, such as one or more wireless network adapters and one or more hard-wired network adapters, that connect the device to computer network 200. Network access type 350 can be a wireless access point that connects device 300 to computer network 200 via is a local area wireless technology that allows the device to participate in computer networking certain radio band frequencies. Network access type 350 can be a wired local area network (LAN) connection, such as an Ethernet connection. Network access type 350 can also be a mobile telecommunications technology, such as found in cellular telephones, that connect device 300 to computer network 200 via a wireless network provided by a mobile carrier utilizing a number of cell phone towers or one or more satellites.

Update providers 360 send update notifications to subscribers which, in this case, are users of motion sensitive device 300. For example, an update notification may be sent to a user's device notifying the user that an updated version of an application, or "app," is available for download and installation on the user's device. The update may be sent for any number of reasons, such as a security update, error or bug fixes, introduction of new features, and the like.

As explained in greater detail herein, the user of device 300 establishes preferences using configuration process 310. These preferences include whether the device must be "active" in order to alert the user of notifications. Activity of the device can be usage of the device by the user as well as movement of the device, such as when the device is in the user's pocket and the user is moving about. Activity sensed at the device indicate that the user is awake and will likely not be disturbed by an alert regarding an update notification. In addition, the user can establish one or more "quite time windows" which represent times at which the user does not generally wish to be disturbed, such as when the user is usually sleeping, meditating, in class or meetings, etc. Further configuration settings may be established as shown in the system setup drawing shown on FIG. 4.

Figure 4:
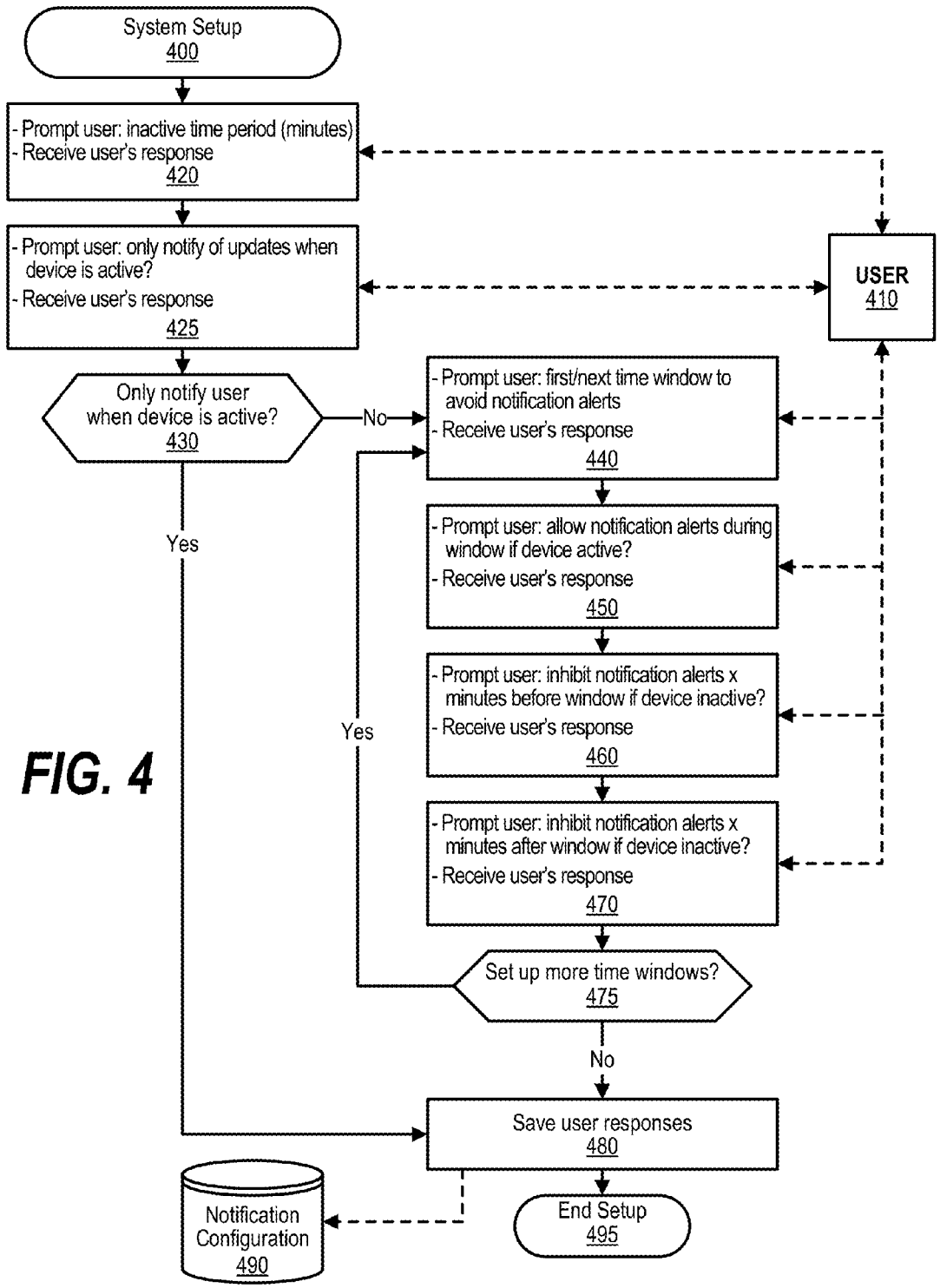
FIG. 4 is a flowchart showing steps taken by a setup process.

FIG. 4 is a flowchart showing steps taken by a setup process. FIG. 4 commences at 400 and shows the steps taken by a process that performs a system setup process that configures the device for alerts regarding notifications received at the device. At step 420, the process prompts user 410 for the inactive time period (e.g., minutes, etc.) that is the time period that, if no activity is sensed at the device, the device is considered "inactive." If a notification arrives within this time period, the notification is deemed to have arrived when the device is "active." Step 420 also receives the response from user 410. For example, if the user sets the time period as being "15 minutes" and a notification is received 10 minutes after the device has last sensed activity, then the device is still considered "active" as the notification arrived before the expiration of the time period. However, if the notification was received 20 minutes after the device last sensed activity, then the device would be considered "inactive" for purposes of alerting the user of the notification. At step 425, the process prompts user 410 to inquire if the user only wants alerts of notifications when the device is deemed "active." Step 425 also receives the response from user 410.

The process determines as to whether the user only wishes to be alerted of notifications when the device is deemed to be active with the notification arriving after the last sense activity at the device and within the time period established at step 420 by the user (decision 430). If the user only wishes to be alerted of notifications when the device is deemed to be active, then decision 430 branches to the 'yes' branch bypassing steps 440 through 475 that deal with quiet time windows. On the other hand, if the user does not only wish to be alerted of notifications when the device is deemed to be active, then decision 430 branches to the 'no' branch to execute steps 440 through 475 that establish quiet time windows and also establishes times that alerts are allowed even when the device is deemed to be inactive, such as in the middle of the day.

At step 440, the process prompts the user regarding the first quiet time window during which the user wishes to avoid notification alerts. Step 440 also receives the user's response. At step 450, the process prompts the user regarding whether to allow notification alerts during the first quiet time window if device is deemed active, such as when the user is staying up late and using the device. Step 450 also receives the user's response. At step 460, the process prompts the user regarding whether to inhibit notification alerts a certain number of minutes before the first quiet time window if the device is inactive, such as when the user goes to bed a half hour earlier than the quiet time window that is established for the user's usual sleep time. Step 460 also receives the user's response. At step 470, the process prompts the user regarding whether to inhibit notification alerts so many minutes after the first quiet time window if the device is deemed inactive, such as when the user is sleeping an extra half hour past the usual wake up time established with the first quiet time window. Step 470 also receives the user's response. The process determines as to whether the user wishes to set up more quiet time windows (decision 475). If the user wishes to set up more quiet time windows, then decision 475 branches to the 'yes' branch which loops back to establish additional quiet time windows. This looping continues until the user does not wish to set up any more quiet time windows, at which point decision 475 branches to the 'no' branch to complete the setup process.

At step 480, the process saves user alert preferences in memory 490 with memory 490 being accessible by processors running on the device. FIG. 4 processing thereafter ends at 495.

Figure 5:
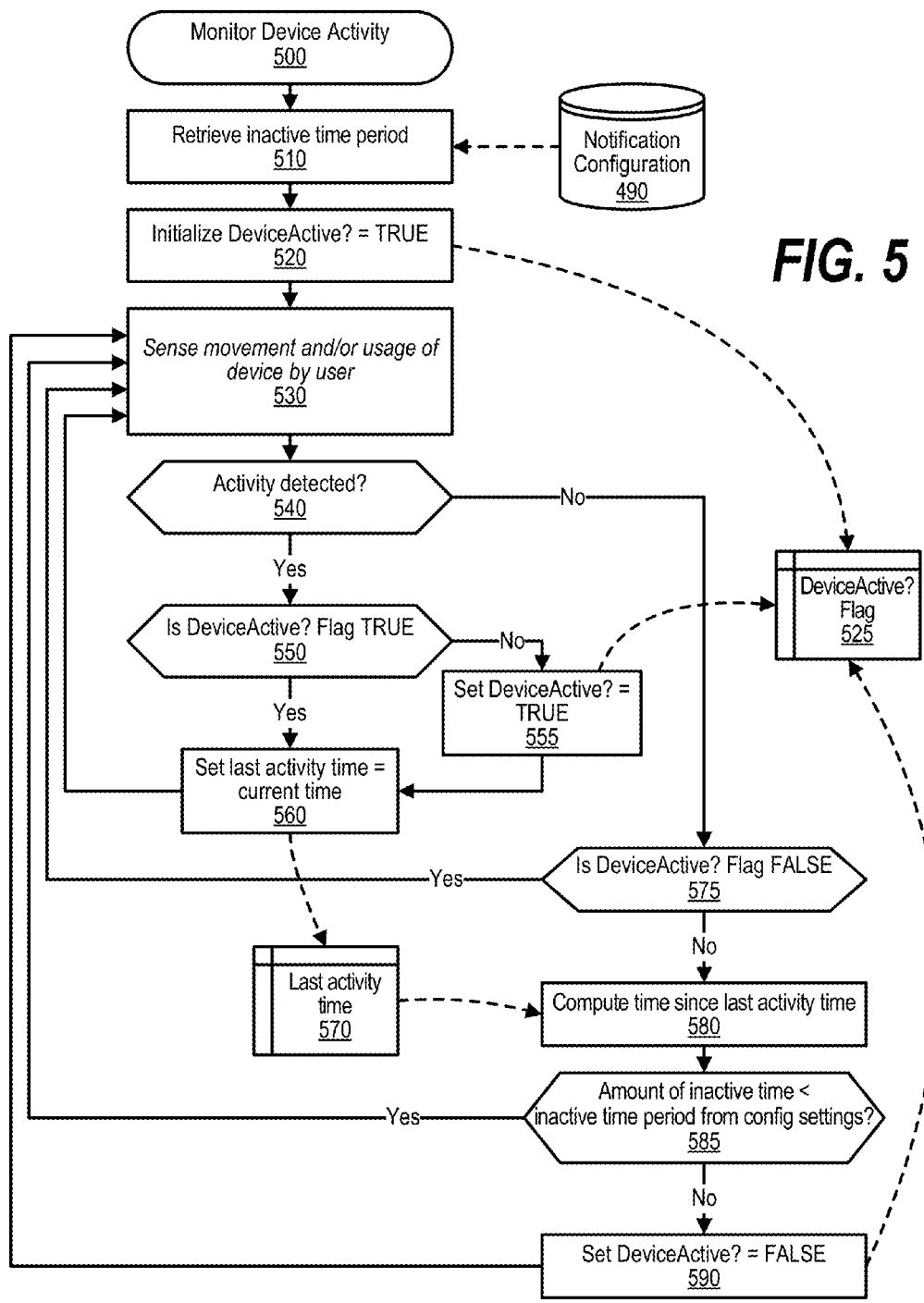
FIG. 5 is a flowchart showing steps taken by a process that monitors activity at a device, such as usage or movement.

FIG. 5 is a flowchart showing steps taken by a process that monitors activity at a device, such as usage or movement. FIG. 5 commences at 500 and shows the steps taken by a process that performs a monitoring process that determines if activity has occurred at the device within a time period, such as the preferred time period established by the user in FIG. 4. At step 510, the process retrieves the time period, such as that established by the user, from data store 490. For example, the user may set the time period to be 15 minutes so that if activity is not sensed within 15 minutes, then the device is deemed to be inactive. At step 520, the process initializes variable DeviceActive? to be TRUE signifying that the device is initialized as being in an active state. The DeviceActive? flag is stored in memory area 525. At step 530, the process attempts to sense movement and/or usage of the device by the user, such as the user inputting data or requests at the device or the device being moved as the user walks about with the device in his pocket.

The process determines as to whether activity is detected at the device (decision 540). If activity is detected at the device, then decision 540 branches to the 'yes' branch to perform steps 550 through 560. On the other hand, if no activity is detected at the device, then decision 540 branches to the 'no' branch to perform steps 575 through 590. If activity is detected at the device, then decision 540 branches to the 'yes' branch whereupon the process next determines as to whether the DeviceActive? flag has already been set to TRUE for the device (decision 550). If the DeviceActive? flag has already been set to TRUE for the device, then decision 550 branches to the 'yes' branch bypassing step 555. On the other hand, if the DeviceActive? flag has not already been set to TRUE for the device, then decision 550 branches to the 'no' branch whereupon, at step 555, the process sets the DeviceActive? flag to TRUE. At step 560, the process sets last activity time to the current time signifying the last time the device was found to be active. The last activity time is stored in memory area 570. Processing then loops back to reattempt the sensing in step 530.

If activity was not detected at the device, then decision 540 branches to the 'no' branch whereupon the process next determines as to whether the DeviceActive? flag is currently set to FALSE, indicating that the device is already deemed to be inactive (decision 575). If the DeviceActive? flag is currently set to FALSE, then decision 575 branches to the 'yes' branch which loops back to repeat the sensing attempt at step 530. On the other hand, if the DeviceActive? flag is not currently set to FALSE, then decision 575 branches to the 'no' branch for further analysis. At step 580, the process computes the amount of time that has transpired since the last activity time. For example, if the last activity time was at 10:00 PM and the current time is 10:12 PM, then the amount of time that has transpired is 12 minutes.

The process determines as to whether the current amount of inactive time (e.g., 12 minutes, etc.) is less than the time period retrieved at step 510 from the configuration settings (decision 585). If the current amount of inactive time is less than the time period retrieved, then decision 585 branches to the 'yes' branch which loops back to reattempt sensing activity of the device at step 530. On the other hand, if the current amount of inactive time (e.g., 20 minutes, etc.) is greater than or equal to the time period (e.g., 15 minutes, etc.) retrieved at step 510 from the configuration settings, then decision 585 branches to the 'no' branch whereupon, at step 590, the process sets the DeviceActive? flag to FALSE indicating that the device is now deemed to be inactive. The DeviceActive? flag is updated in memory area 525. Processing then loops back to reattempt the sensing in step 530.

Figure 6:
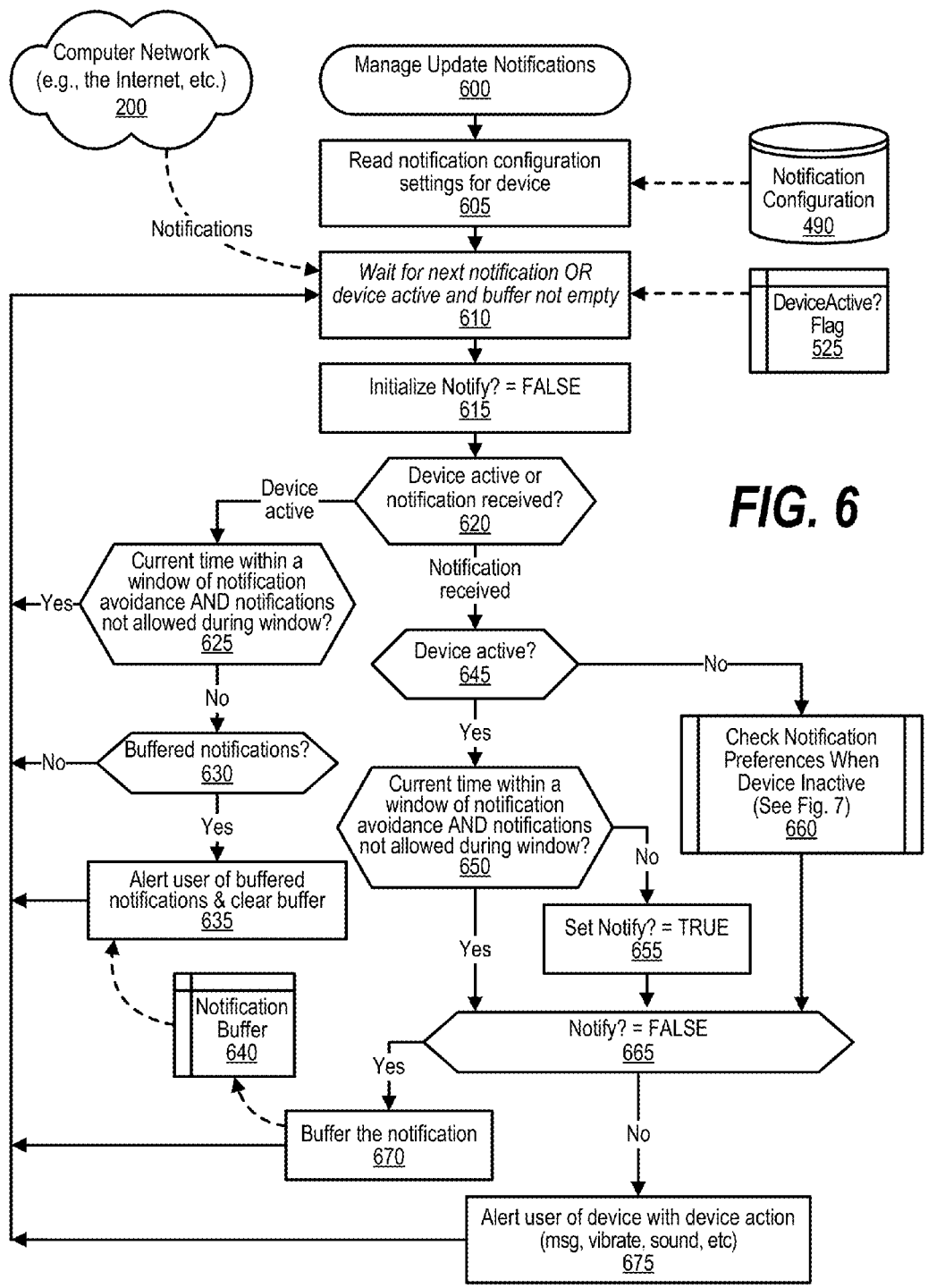
FIG. 6 is a flowchart showing steps taken by a process that manages update notifications at a device based on detected activity at the device.

FIG. 6 is a flowchart showing steps taken by a process that manages update notifications at a device based on detected activity at the device. FIG. 6 commences at 600 and shows the steps taken by a process that performs steps that manage update notifications alerts to a user of a device. At step 605, the process reads notification configuration settings established for the device from data store 490. These settings may include preferences established by the user using the process shown in FIG. 4. At step 610, the process waits for the next notification to be received at the device via computer network 200 or until the device is deemed to be active and the buffer storing notifications is not empty. At step 615, the process initializes the Notify? flag to be FALSE with the Notify? flag controlling whether the user of the device is alerted to a notification received at the device.

The process determines as to whether the device is currently deemed active or a notification has been received at the device (decision 620). If the device is currently deemed active, then decision 620 branches to the left branch to process steps 625 through 635. On the other hand, if a notification has been received at the device, then decision 620 branches to the downward branch to perform steps 645 through 675.

If the device is active, then the process next determines as to whether the current time is within a quiet time window of notification avoidance and notifications are not allowed during the quiet time window (decision 625). If the current time is within a quiet time window of notification avoidance and notifications are not allowed during the quiet time window, then decision 625 branches to the 'yes' branch which inhibits alerting the user of the device and loops back to step 610. On the other hand, if the current time is not within a quiet time window of notification avoidance or if notifications are allowed during the quiet time window, then decision 625 branches to the 'no' branch to alert the user of buffered notifications. The process determines as to whether there are buffered notifications of which to alert the user (decision 630). If there are buffered notifications of which to alert the user, then decision 630 branches to the 'yes' branch whereupon, at step 630, the process alerts the user of buffered notifications stored in memory area 640 and the buffer is then cleared before processing loops back to step 610. On the other hand, if there are no buffered notifications of which to alert the user, then decision 630 branches to the 'no' branch bypassing step 635 and processing loops back to step 610.

Returning to decision 620, if a notification has been received, then decision 620 branches to the downward branch whereupon the process next determines as to whether the device is currently deemed to be active (decision 645). If the device is currently deemed to be active, then decision 645 branches to the 'yes' branch to process steps 650 and 655. On the other hand, if the device is currently deemed to be inactive, then decision 645 branches to the 'no' branch to perform predefined process 660.

If the device is currently deemed to be active, then the process next determines as to whether the current time is within a quiet time window of notification avoidance and whether notifications are not allowed during this window (decision 650). If the current time is within a quiet time window of notification avoidance and whether notifications are not allowed during this window, then decision 650 branches to the 'yes' branch bypassing step 655, otherwise decision 650 branches to the 'no' branch whereupon, at step 655, the Notify? flag is set to TRUE.

Figure 7:
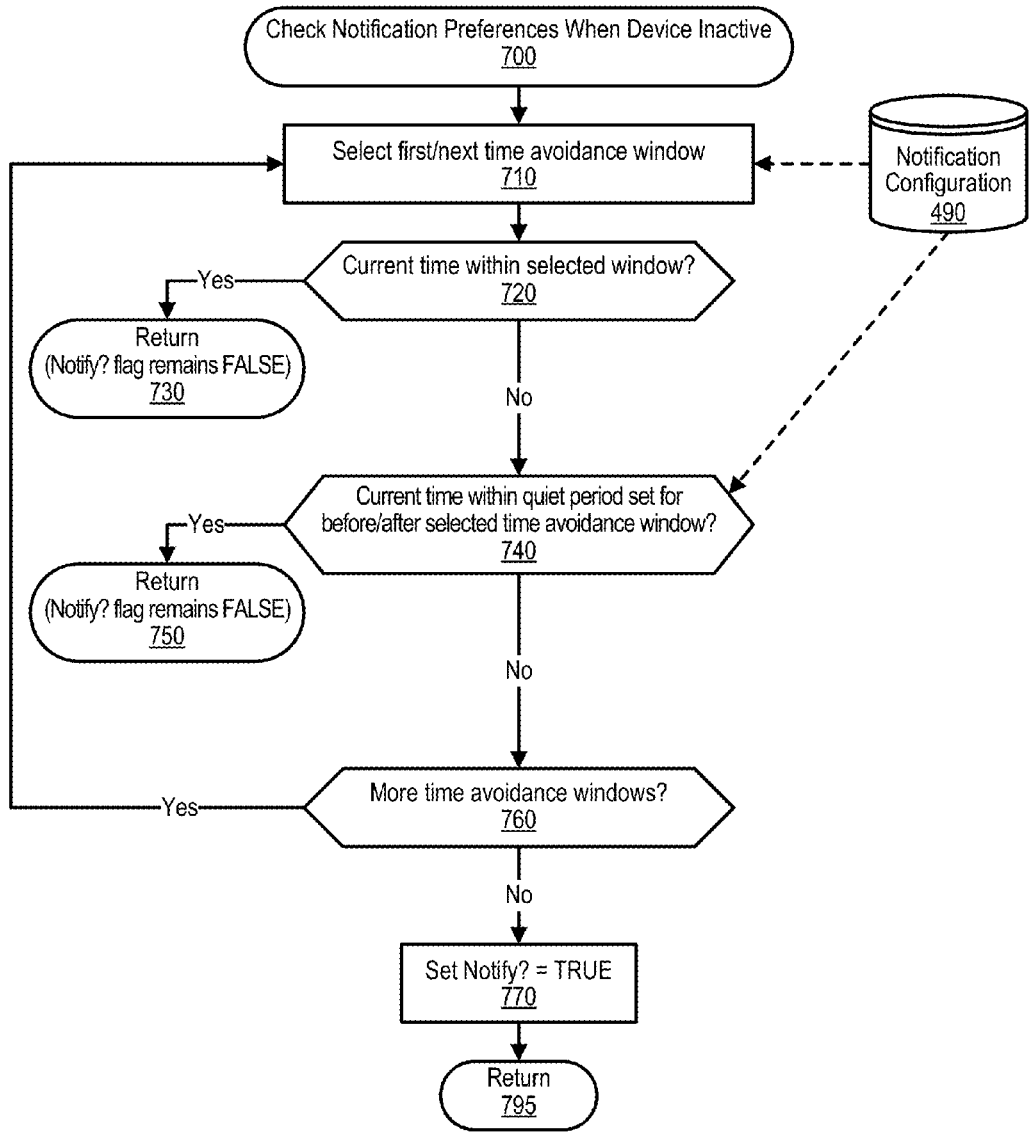
FIG. 7 is a flowchart showing steps taken by a process that checks a user's notification preferences when the device is inactive.

Returning to decision 645, if the device is currently deemed inactive, then decision 645 branches to the 'no' branch whereupon, at predefined process 660, the process performs the Check Notification Preferences When Device Inactive routine (see FIG. 7 and corresponding text for processing details).

After the notification received processing has been performed, the process determines as to whether the Notify? flag has been set to FALSE (decision 665). If the Notify? flag has been set to FALSE, then decision 665 branches to the 'yes' branch whereupon, at step 670, the process stores the received notification in buffer memory 640. On the other hand, if the Notify? flag has been set to TRUE, then decision 665 branches to the 'no' branch whereupon, at step 675, the process alerts the user of the device with a device action (message, vibrate, sound, etc) informing the user of the received notification.

FIG. 7 is a flowchart showing steps taken by a process that checks a user's notification preferences when the device is inactive. FIG. 7 commences at 700 and shows the steps taken by a process that performs steps to check a user's notification preferences when the device is deemed to be inactive. At step 710, the process selects the first quiet time window from ds 490. The process determines as to whether the current time is within the selected quiet time window (decision 720). If the current time is within the selected quiet time window, then decision 720 branches to the 'yes' branch, whereupon at 730 processing returns to the calling routine (see FIG. 6) with the Notify? flag remaining FALSE. On the other hand, if the current time is not within the selected quiet time window, then decision 720 branches to the 'no' branch for further processing. The process determines as to whether the current time is within an additional quiet period set for before or after the selected quiet time window (decision 740). If the current time is within an additional quiet period set for before or after the selected quiet time window, then decision 740 branches to the 'yes' branch whereupon at 750 processing returns to the calling routine (see FIG. 6) with the Notify? flag remaining FALSE. On the other hand, if the current time is not within an additional quiet period set for before or after the selected quiet time window, then decision 740 branches to the 'no' branch for further processing. The process determines as to whether there are more quiet time windows to process (decision 760). If there are more quiet time windows to process, then decision 760 branches to the 'yes' branch which loops back to select and process the next quiet time window as discussed above. This looping continues until there are more quiet time windows to process, at which point decision 760 branches to the 'no' branch. Because not quiet time windows were encountered that prohibit alerting the user of the notification, at step 770, the process sets the Notify? flag to TRUE. FIG. 7 processing thereafter returns to the calling routine (see FIG. 6) at 795.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving a notification at a device, wherein the notification is received at a current time;
   retrieving a quiet time window and one or more alert preferences;
   sensing that an activity has occurred at the device within a time period after the quiet time window, wherein the activity is a communication received at the device;

in response to detecting that the device has been moved since the end of the quiet time window, generating an alert at the device, wherein the alert corresponds to the activity; and in response to detecting that the device has not been moved since the end of the quiet time window, inhibiting the alert at the device.

2. The method of claim 1 wherein the activity is selected from the group consisting of an incoming telephone call, an email message, and a text message.

3. The method of claim 1 further comprising:
retrieving the quiet time window during which the user has established a preference to inhibit alerts;
determining that the current time is within the quiet time window; and
inhibiting the alert at the device in response to the determination.

4. The method of claim 1 wherein, in response to sensing that the activity failed to occur within the time period, the method further comprises:
buffering the notification in a memory; and
displaying the notification on a display of the device in response to sensing the activity at a time after the current time.

5. The method of claim 1 further comprising:
retrieving one or more quiet time windows that includes the quiet time window and the one or more alert preferences from a memory included in the device; and
sensing that the activity occurred within the time period, wherein an amount of time of the time period is specified by one of the alert preferences.

6. A device comprising:
one or more processors;
a memory coupled to at least one of the processors;
an movement sensor accessible by at least one of the processors; and
a set of instructions stored in the memory and executed by at least one of the processors to:
receive a notification at a device, wherein the notification is received at a current time;
retrieve one or more quiet time windows and one or more alert preferences;
sense that an activity has occurred at the device within a time period after the quiet time window, wherein the activity is a communication received at the device;
in response to detecting that the device has been moved since the end of the quiet time window, generating an alert at the device, wherein the alert corresponds to the activity; and
in response to detecting that the device has not been moved since the end of the quiet time window, inhibiting the alert at the device.

7. The device of claim 6 wherein the activity is selected from the group consisting of an incoming telephone call, an email message, and a text message.

8. The device of claim 6 wherein the set of instructions further comprise further instructions executed by at least one of the processors to:
retrieve the quiet time window during which the user has established a preference to inhibit alerts;
determine that the current time is within the quiet time window; and
inhibit the alert at the device in response to the determination.

9. The device of claim 6 wherein, in response to sensing that the activity failed to occur within the time period, the set of instructions further comprise further instructions executed by at least one of the processors to:
buffer the notification in a memory; and
display the notification on a display of the device in response to sensing the activity at a time after the current time.

10. The device of claim 6 wherein the set of instructions further comprise further instructions executed by at least one of the processors to:
retrieve one or more quiet time windows that includes the quiet time window and the one or more alert preferences from a memory included in the device; and
sense that the activity occurred within the time period, wherein an amount of time of the time period is specified by one of the alert preferences.

11. A computer program product comprising:
a tangible computer readable storage medium comprising a set of computer instructions, the computer instructions effective to:
receive a notification at a device, wherein the notification is received at a current time;
retrieve one or more quiet time windows and one or more alert preferences;
sense that an activity has occurred at the device within a time period after the quiet time window, wherein the activity is a communication received at the device;
in response to detecting that the device has been moved since the end of the quiet time window, generating an alert at the device, wherein the alert corresponds to the activity; and
in response to detecting that the device has not been moved since the end of the quiet time window, inhibiting the alert at the device.

12. The computer program product of claim 11 wherein the activity is selected from the group consisting of an incoming telephone call, an email message, and a text message.

13. The computer program product of claim 11 wherein the set of instructions further comprise instructions effective to:
retrieve the quiet time window during which the user has established a preference to inhibit alerts;
determine that the current time is within the quiet time window; and
inhibit the alert at the device in response to the determination.

14. The computer program product of claim 11 wherein, in response to sensing that the activity failed to occur within the time period, the set of instructions further comprise instructions effective to:
buffer the notification in a memory; and
display the notification on a display of the device in response to sensing the activity at a time after the current time.

15. The computer program product of claim 11 wherein the set of instructions further comprise instructions effective to:
retrieve one or more quiet time windows that includes the quiet time window and the one or more alert preferences from a memory included in the device; and
sense that the activity occurred within the time period, wherein an amount of time of the time period is specified by one of the alert preferences.

* * * * *